(12) United States Patent
McKinney

(10) Patent No.: US 6,358,411 B1
(45) Date of Patent: Mar. 19, 2002

(54) WASTEWATER TREATMENT PLANT

(76) Inventor: Jerry L. McKinney, 1202 N. Main St., Lumberton, TX (US) 77657

( * ) Notice: Subject to any disclaimer, the term of this patent is extended or adjusted under 35 U.S.C. 154(b) by 0 days.

(21) Appl. No.: 09/574,326

(22) Filed: May 19, 2000

(51) Int. Cl.$^7$ .............................. B01D 21/00; C02F 1/74
(52) U.S. Cl. .................... 210/170; 210/195.1; 210/197; 210/201; 210/220; 210/221.2; 210/260; 210/532.1
(58) Field of Search .............................. 210/170, 195.1, 210/197, 200, 201, 206, 220, 221.1, 221.2, 252, 258, 259, 260, 532.1

(56) References Cited

U.S. PATENT DOCUMENTS

| | | | |
|---|---|---|---|
| 2,987,186 A | | 6/1961 | Burgoon et al. |
| 3,126,333 A | | 3/1964 | Williams |
| 3,347,381 A | | 10/1967 | Minch et al. |
| 3,598,236 A | * | 8/1971 | Norlander et al. |
| 3,662,890 A | * | 5/1972 | Grimshaw |
| 3,837,494 A | | 9/1974 | Stevenson |
| 3,923,656 A | | 12/1975 | Krebs et al. |
| 3,923,657 A | | 12/1975 | Roser |
| 3,951,817 A | | 4/1976 | Snyder |
| 4,160,723 A | | 7/1979 | Kovacs |
| 4,238,338 A | | 12/1980 | Kinzer |
| 4,246,114 A | | 1/1981 | Krebs et al. |
| 4,337,152 A | | 6/1982 | Lynch |
| 4,351,722 A | * | 9/1982 | Mixon |
| 4,391,002 A | | 7/1983 | Marti |
| 4,608,157 A | * | 8/1986 | Graves |

(List continued on next page.)

FOREIGN PATENT DOCUMENTS

| WO | WO 00/15322 | 3/2000 |
|---|---|---|
| WO | WO 00/15566 | 3/2000 |

OTHER PUBLICATIONS

"Wastewater Technology," Report No. S40–8–3, pp. 1–27, 32–34. National Sanitation Foundation, Ann Arbor, Michigan, Dec. 1990, pp. 1–27 and 32–34.
Brochure: "Home Plant Upflow Filter," 2 pages. Jet Inc., Beaumont, Texas 1978.
Brochure: "New Improved Zabel Multi–Purpose Filter," 2 pages. Zabel Industries, Inc., New Albany, Indiana, admitted prior art.
Brochure: "Residential & Commercial Sewage Treatment System," 4 pages, Nayadic, Inc., Dayton, Ohio, admitted prior art.
Flier: "Southern Aerobic Systems Quick & Easy SM500 T & P," 2 pages. Southern Manufacturing Co., Port Arthur, Texas, admitted prior art.
Flier: "Aqua Safe," 2 pages. Ecological Tanks, Inc., Downsville, Louisiana admitted prior art.
Flier: "Home Wastewater Treatment Plant Specifications," 2 pages. Jet Inc., Cleveland, Ohio,1980.
Brochure: "When Experience Counts," 6 pages. Clearstream Wastewater Systems, Inc., Beaumont, Texas, admitted prior art.

(List continued on next page.)

Primary Examiner—David A. Simmons
Assistant Examiner—Fred Prince
(74) Attorney, Agent, or Firm—Browning Bushman P.C.

(57) ABSTRACT

A wastewater treatment plant comprises a first containment vessel, a second containment vessel forming an aerobic treatment chamber, the second containment vessel having an inlet and an outlet, there being a compartment formed in the first containment vessel that effectively divides the first containment vessel into a pretreatment chamber and a holding chamber. An outlet from the pretreatment chamber is in open communication with an inlet to the second containment vessel, while an outlet for the aerobic treatment chamber is in open communication with the inlet to the holding chamber.

20 Claims, 4 Drawing Sheets

U.S. PATENT DOCUMENTS

| | | | |
|---|---|---|---|
| 4,650,577 | A | | 3/1987 | Hansel |
| 4,664,795 | A | | 5/1987 | Stegall et al. |
| 4,710,295 | A | | 12/1987 | Zabel |
| 4,834,879 | A | | 5/1989 | Stegall et al. |
| 4,897,196 | A | * | 1/1990 | Copa et al. |
| 4,929,349 | A | | 5/1990 | Beckman |
| 4,933,076 | A | * | 6/1990 | Oshima et al. |
| 4,983,285 | A | | 1/1991 | Nolen |
| 5,221,470 | A | | 6/1993 | McKinney |
| 5,254,246 | A | | 10/1993 | Rivelli et al. |
| 5,266,239 | A | | 11/1993 | Drewery |
| 5,490,935 | A | | 2/1996 | Guy |
| 5,578,202 | A | * | 11/1996 | Hirane |
| 5,599,452 | A | * | 2/1997 | MacLaren et al. |
| 5,785,854 | A | | 7/1998 | McKinney |
| D423,638 | S | | 4/2000 | Drewery |
| D424,659 | S | | 5/2000 | Drewery |
| 6,190,554 | B1 | * | 2/2001 | Mandt |

OTHER PUBLICATIONS

Brochure: "The Clear Choice: Whitewater Mechanical Sewage Treatment System," 4 pages. Delta Fiberglass & Environmental Products, Inc., Denham Springs, Louisiana, admitted prior art.

Brochure: "Oldham Incorporated Sewage Treatment Systems: Aerated Sewage Treatment System for Individual Residences," 6 pages. Robert R. Oldham, Inc./Murphy Cormier General Contractors, Inc., Lake Charles, Louisiana, admitted prior art.

Clearstream Wastewater Systems, Inc. brochure on Clearstream Wastewater Treatment System, 4 pages. Clearstream Wastewater Systems, Inc., Beaumont, Texas, admitted prior art.

Drawing: "Singulair Model 900 System Installation and Mounting Details," Norweco, Sep. 1, 1990.

Brochure: "Aerobic Treatment System," 4 pages. Hoot Aerobic Systems, Inc., Lake Charles, Louisiana, Feb. 1999.

Brochure: "Singulair Bio–Kinetic Wastewater Treatment System," 4 pages. 1995.

Flier: "Introducing Set–N–Go," 2 pages. Hydro–Action, Inc., Beaumont, Texas, admitted prior art.

Brochure: "Single Home FAST Wastewater Treatment System," 4 pages. Bio–Microbics, Inc., 1996.

Brochure: "Class I Aerobic Systems for Residential and Commercial," 4 pages. Hydro–Action, Inc., Kountze, Texas, 1994.

* cited by examiner

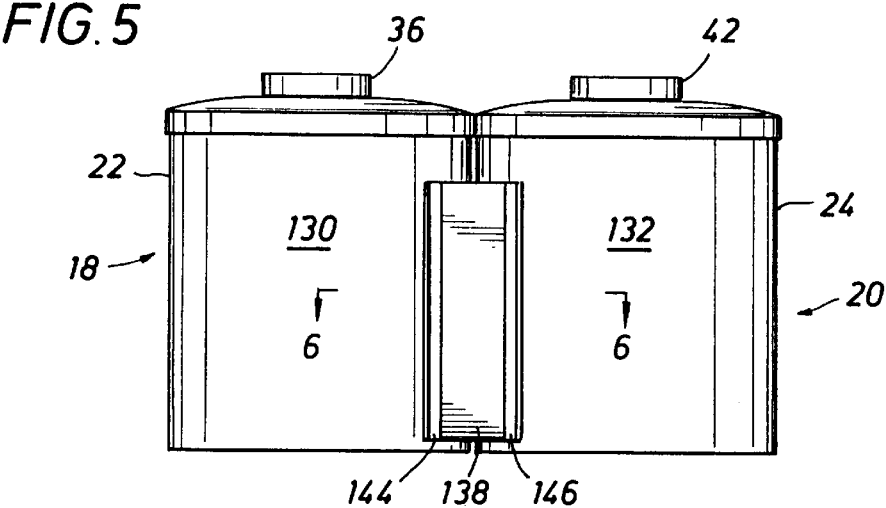
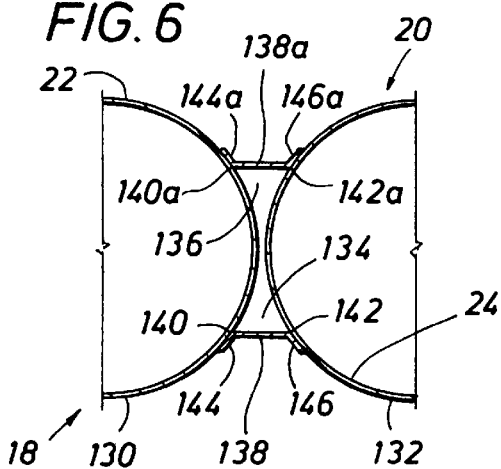
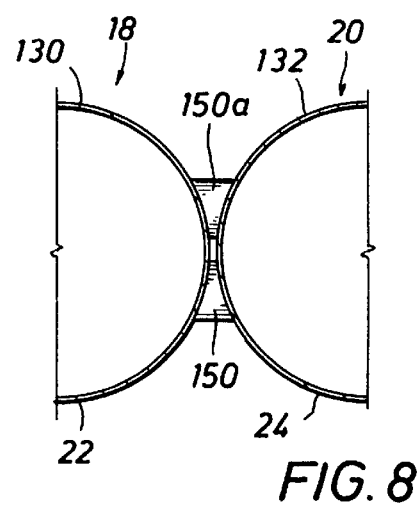
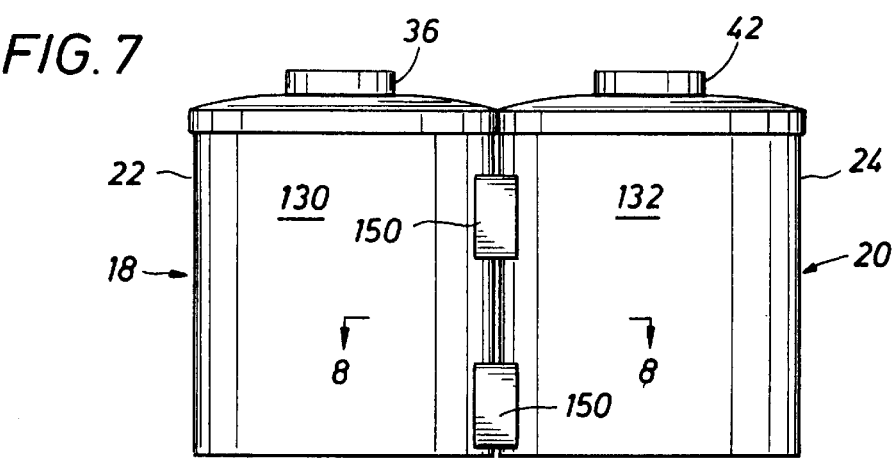

WASTEWATER TREATMENT PLANT

BACKGROUND OF THE INVENTION

1. Field of the Invention

The present invention relates to wastewater treatment plants and, more particularly, to a wastewater treatment plant for residential usage that is compact, can be easily handled as a single unit, and does not require excavations of varying depths.

2. Description of the Prior Art

Typical wastewater treatment plants of the type under consideration comprise a pretreatment tank or vessel, commonly referred to as a trash tank, an aerobic treatment vessel, generally comprised of an aerobic treatment chamber and a clarifier chamber, and a holding vessel, commonly referred to as a pump tank. As is well known to those skilled in the art, the wastewater flows into the trash tank, where solids settle. A liquid effluent from the trash tank flows into the aerobic treatment vessel and, more specifically, the aerobic treatment chamber where it is aerated, the aerated liquid being discharged from the clarification chamber into the holding or pump tank from whence it can be discharged for irrigation purposes at appropriate times, generally at night. Flow between the three vessels or tank is accomplished by gravity. Accordingly, either the vessels or tanks must be at successively lower levels or the plumbing connections between the various tanks set at proper elevations to ensure gravity flow.

While there are prior art single structure design systems that obviate the necessity for excavations at various levels to accommodate the three vessels, such systems are quite bulky, require a large excavation, and are difficult to handle. There are also one-piece systems formed of three separate compartments, each of the compartments having a riser or hatch that protrudes above ground. There are still other one-piece systems that are subject to uneven loading in the event the volume in the pump tank drops to a low level. Such uneven loading can result in flotation shifting in areas with a high water table and in certain cases can place excessive stresses on the system. Lastly, there are three vessel systems in which separate vessels are banded together with steel bands in an attempt to form a unitary system.

There still remains a need for a single unit system that can be easily transported, handled, and installed, requires only one excavation at one elevation, minimizes the number of risers protruding above ground, and distributes the loading on the system, substantially preventing any tendency of the unit to float or undergo bending stresses in areas having a high water table and when the volume of the pump tank or chamber is at a low level.

SUMMARY OF THE INVENTION

It is therefore an object of the present invention to provide a wastewater treatment plant that is compact.

Another object of the present invention is to provide a unitary wastewater treatment plant that is easy to handle and requires only a single excavation at one elevation for installation.

Yet a further object of the present invention is to provide a wastewater treatment plant that minimizes the number of above-ground risers.

Still a further object of the present invention is to provide a unitary wastewater treatment plant that remains weight-balanced despite the level of water in the holding or pump chamber.

The above and other objects of the present invention will become apparent from the drawings, the description given herein, and the appended claims.

The wastewater treatment plant of the present invention comprises a first containment vessel and a second containment vessel, the second containment vessel forming an aerobic treatment chamber, the second containment vessel having an inlet and an outlet. A compartment is formed in the first containment vessel, the compartment and the first containment vessel cooperating to form a pretreatment chamber inside the compartment and a holding chamber formed by the compartment and the first containment vessel. Both the pretreatment chamber and the holding chamber have an inlet and an outlet, the outlet from the pretreatment chamber being in open communication with the inlet to the second containment vessel, the outlet from the aerobic treatment chamber being in open communication with the inlet to the holding chamber.

BRIEF DESCRIPTION OF THE DRAWINGS

FIG. 5 is an elevational view of the wastewater treatment plant shown in FIG. 1 and displaying one method of forming the wastewater treatment plant into a single, rigid unit;

FIG. 6 is a cross-sectional view taken along the lines 6—6 of FIG. 5;

FIG. 7 is an elevational view of the wastewater treatment plant shown in FIG. 1 and displaying another method of forming the wastewater treatment plant into a single, rigid unit; and FIG. 8 is a cross-sectional view taken along the lines 8—8 of FIG. 7.

DESCRIPTION OF THE PREFERRED EMBODIMENTS

Figure 1:
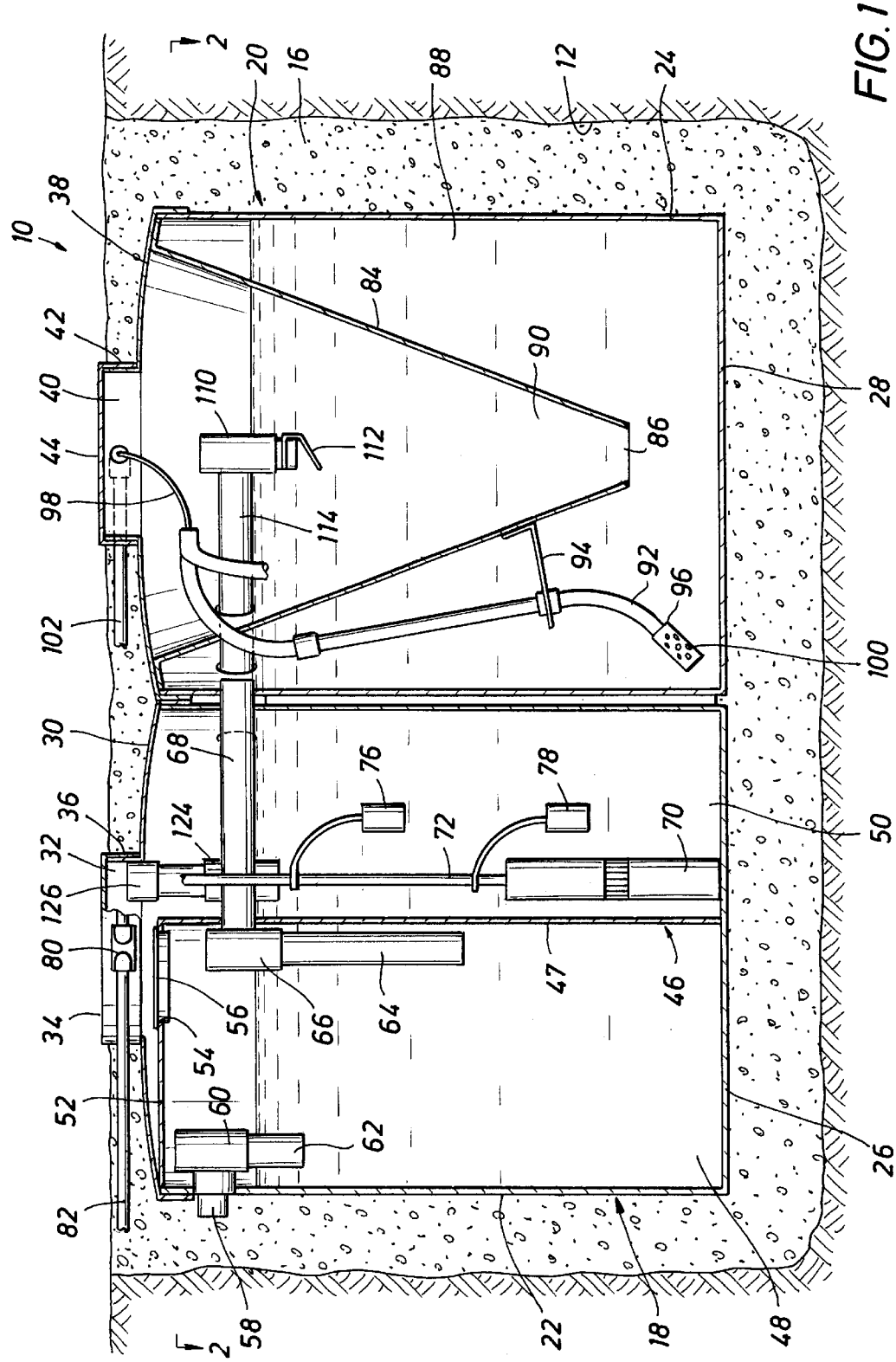
FIG. 1 is an elevational view, partly in section, of one embodiment of the wastewater treatment plant of the present invention installed in an underground excavation.
Figure 2:
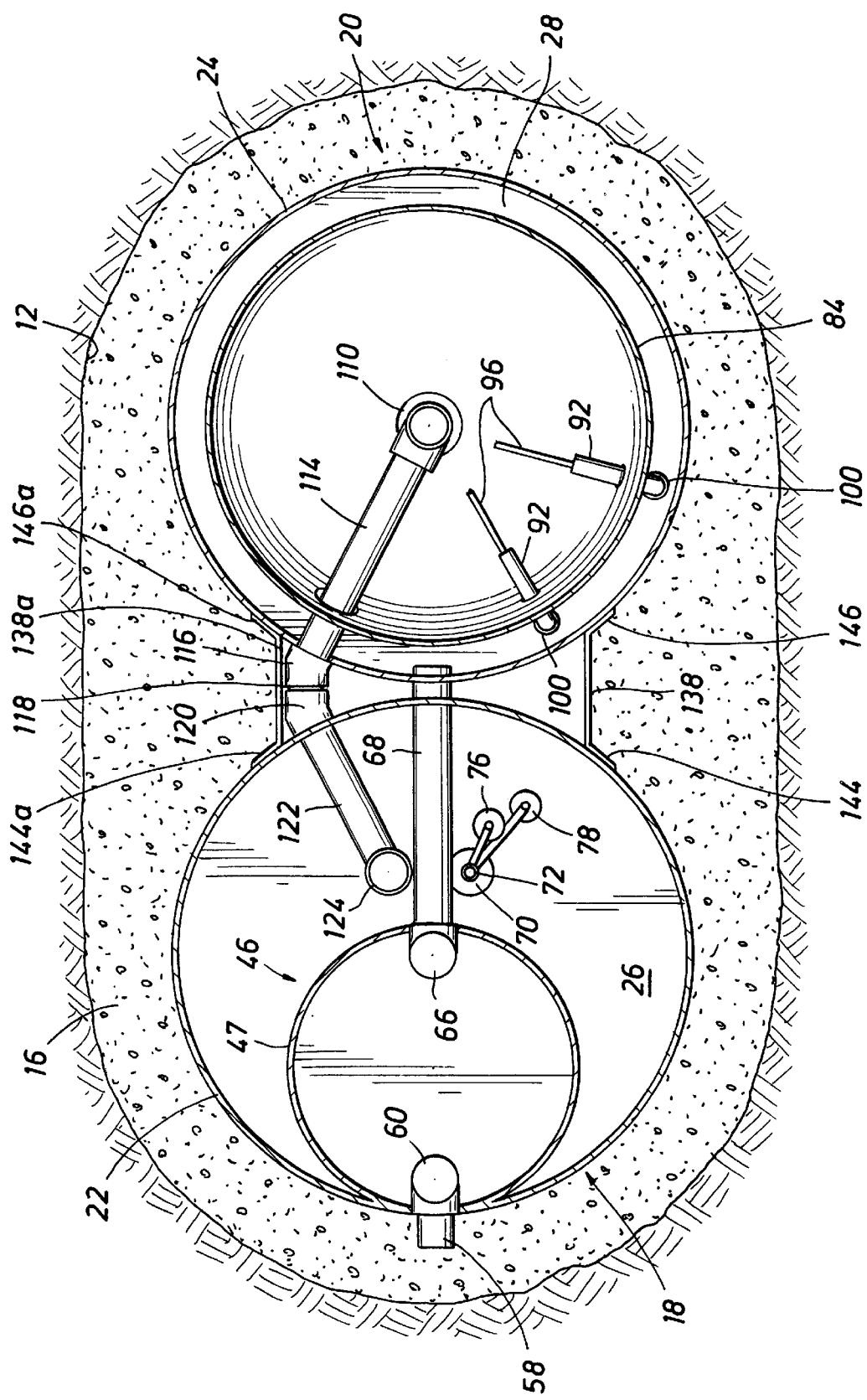
FIG. 2 is a cross-sectional view taken along the lines 2—2 of FIG. 1.

With reference first to FIG. 1, the wastewater treatment plant, shown generally as 10, is shown as being disposed in an underground excavation 12, excavation 12 having a single elevation, a generally horizontal bottom, and a generally oval configuration, as shown in FIG. 2. As is typical, excavation 12 is filled with fill dirt, gravel, or the like 16.

Structurally, wastewater treatment plant 10 is comprised of a first containment vessel, shown generally as 18, and a second containment vessel, shown generally as 20. In the embodiment shown in FIGS. 1 and 2, containment vessels 18 and 20 are generally cylindrical, having cylindrical side walls 22 and 24, respectively. Additionally, containment vessels 18 and 20 have generally planar bottom walls 26 and 28, respectively, bottom walls 26 and 28 being, as shown, substantially coplanar. First containment vessel 18 has a top wall 30 forming an access opening 32 that is selectively covered with a removable cover or hatch 34. It will be seen that opening 32 of top wall 30 is formed by a cylindrical neck or riser 36 that protrudes above top wall 30. Likewise, second containment vessel 20 has a top wall 38 forming an access opening 40, opening 40 being formed by a cylindrical neck 42, a selectively removable hatch 44 being received over opening 40. Necks 32 and 42 actually provide risers that are flush with, or protrude slightly above, the ground such that covers or hatches 34 and 44 are readily accessible.

Disposed and secured in first containment vessel 18 is a third containment vessel 46, containment vessel 46, as shown, being a separate vessel having a cylindrical side wall 47. In effect, third containment vessel 46 forms a compartment in first containment vessel 18 and effectively divides first containment vessel 18 into a pretreatment chamber 48 inside of vessel 46 and a holding chamber 50, holding chamber 50 being formed by the walls of first containment vessel 46 and first containment vessel 18. As best seen in FIG. 1, third containment vessel 46 has a top wall 52 forming an access opening 54. A selectively removable hatch 56 covers access opening 54 to allow ingress into pretreatment chamber 48 as desired. It will also be observed that access opening 54 of third containment vessel 46 is generally in register with access opening 32 in pretreatment vessel 18. Accordingly, when hatch 34 is removed, hatch 56 is readily accessible and can be removed to allow access into pretreatment chamber 48.

A pipe 58 in conjunction with a T-joint 60 and downcomer 62 form an inlet into pretreatment chamber 48. It will be appreciated that pipe 58 will be connected to a source of wastewater—i.e., from a residence or the like. Pretreatment chamber 48 also has an outlet formed by a stand pipe 64, a T-connection 66, and a generally horizontally extending pipe section 68, pipe section 68 extending through holding chamber 50, the wall 22 of vessel 18, and the wall 24 of vessel 20.

Figure 3:
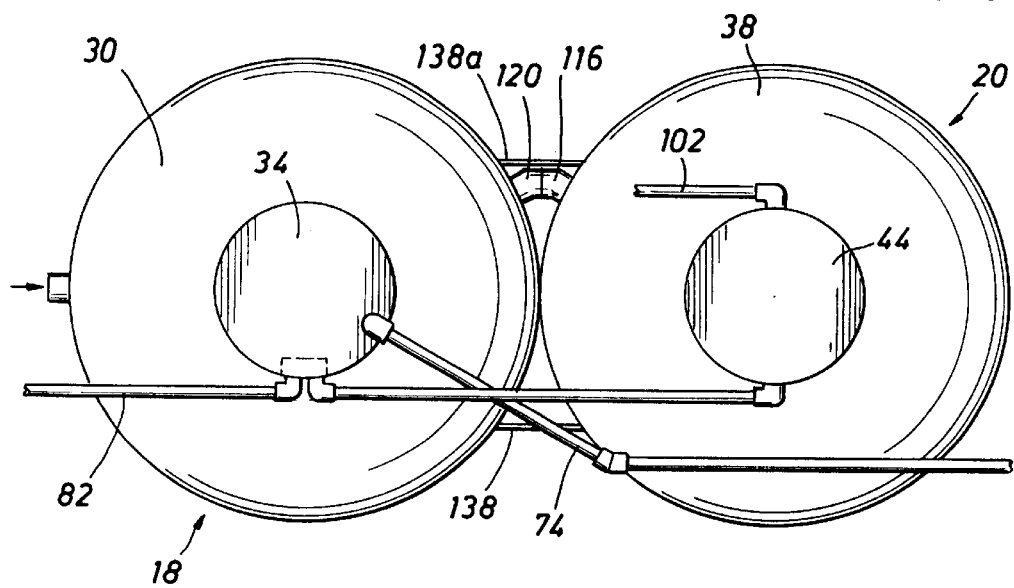
FIG. 3 is a top plan view of the wastewater treatment plant of FIG. 1.

Disposed in holding chamber 50 is a submersible pump 70, pump 70 being connected to a conduit 72, which in turn is connected to an outlet line 74 (see FIG. 3) such that water in holding tank 50 can be pumped via pump 70 and conduits 72 and 74 for discharge, e.g., for use in irrigation, lawn watering, etc. Chamber 50 is also provided with a high water alarm float 76 and a pump control float 78. Electric power to pump 70 is supplied via a suitable conductor (not shown) extending through a conduit 82 connected to an electrical junction box 80.

Second containment vessel 20 is provided with an inverted, frustoconical partition 84 having a bottom opening or mouth 86. Partition 84 serves to divide second containment vessel 20 into an aeration chamber 88 and a clarifier chamber 90, clarifier chamber 90 being located inside of partition 84. As noted, conduit 68 terminates in second containment vessel 20 and, more specifically, in aeration chamber 88, thus forming an inlet into second containment chamber 20. Disposed in aeration chamber 88 is a generally rigid conduit 92, conduit 92 being mounted by means of a bracket 94 secured to partition 84. As can best be seen with reference to FIG. 1, conduit 92 has a lower end 96, which is generally adjacent an intersection of cylindrical side wall 24 and bottom wall 28. A flexible air line 98 is threadedly received through rigid conduit 92 and has affixed at its lower end a diffuser 100. As best seen with reference to FIG. 2, two of such rigid conduits 92, associated flexible air lines 98, and diffusers 100 can be employed. Flexible air lines 98 are connected to a rigid conduit 102, which in turn is connected to a source of an oxygen-containing gas, e.g., an air pump. The use of a single diffuser 100 positioned adjacent an intersection of the side wall 24 and bottom wall 28 of second containment vessel 20 provides unexpected results in that there is created a single aeration locus at the intersection. In other words, and as disclosed in U.S. Pat. No. 5,785,854, the provision of a single aeration locus at the intersection of the cylindrical side wall and the bottom wall creates a unique current flow in second containment vessel 20 that minimizes any settling of solids below the mouth 86 of clarifier chamber 90. In cases where multiple diffusers are used, the positioning of the diffusers should be such that, in concert, they generally provide essentially a single aeration locus; i.e., the diffusers should not be circumferentially displaced from one another to the extent that discrete aeration loci are formed.

It will be appreciated that aeration in aeration chamber 88 could be accomplished by other techniques well known to those skilled in the art. For example, it is known to use submerged aerator systems that are disposed at one or more places adjacent the intersection of the side wall 24 and the bottom wall 28, the submerged aerators drawing in air from tubes extending to ambient air external of aeration chamber 88. Additionally, an aerator could be mounted directly on the top wall of the second containment vessel, the mounted aerator being connected to a rigid tube that extends downwardly into the aeration chamber near the intersection of the side wall 24 and the bottom wall 28, the aerator serving to pump air, generally through a diffuser, into the aeration chamber. It will also be recognized that while the creation of a single aeration locus at the intersection of the side wall 24 and the bottom wall 28 gives superior results in preventing settling of solids underneath the mouth 86 of the clarifier chamber 90, effective aeration can be accomplished even when the aeration loci are disposed substantially radially inwardly of such intersection. Lastly, it will be recognized that while in the preferred embodiment the second containment vessel 20 contains both an aeration chamber and a clarifier chamber, it is within the scope of the present invention that the second containment vessel 20 has no clarifier chamber. In such cases, clarifying of the aerated water is accomplished aerobic digestion or by means of filters or other techniques well known to those skilled in the art. Indeed, it is contemplated that the present invention can encompass a system wherein there is no separate clarifier chamber and wherein there is a filter system disposed between a suitable outlet from the second containment vessel and the inlet to the holding chamber 50.

A T-joint 110 has a gas baffle 112 connected at its lower end, T-joint 110 being connected to a conduit 114 that, as best shown in FIG. 2, passes through partition 84 and the cylindrical wall 24 of second containment vessel 20. Conduit 114 is connected externally of containment vessel 20 to an elbow 116, which in turn is connected by a short section of conduit 118, which in turn is connected to a second elbow 120, elbow 120 being in turn connected to a conduit 122, which, together with a T-joint 124, forms an inlet into holding chamber 50. As best seen with reference to FIG. 1, a chlorine tablet feeder 126 is also connected to T-joint 124.

In operation, wastewater comprised of water and solids enters the pretreatment chamber 48, also commonly referred to as a trash tank, through conduit 58, T-joint 60, and downcomer 62, the solids settling to the bottom of chamber 48. The largely liquid effluent in chamber 48 flows via pipe 64, T-joint 66, and conduit 68 into aeration chamber 88, where it is aerated to effect aerobic digestion. The aerated water flows into clarifier chamber 90 through the mouth 86 of partition 84, where the bulk of any residual solids settle and fall back through mouth 86. The clarified water passes through T-joint 110, conduit 114, elbows 116 and 120, conduit 122, and T-joint 124 into holding chamber 50. In chamber 50, the clarified water is chlorinated via chlorine tablet dispenser 126. The clarified, treated water in chamber 50 is then periodically pumped via pump 70 and conduits 72 and 74 and can be used for watering of lawns, irrigation, or other purposes not generally involved in human consumption. As is generally understood by those skilled in the art, the system is usually programmed such that pump 70 is in operation generally between the hours of 12:00 a.m. and 6:00 a.m.; however, it will be appreciate that the clarified treated water in chamber 50 can be discharged in doses during the day and night. Additionally, the holding tank can be evacuated in a single discharge at any desired time. It is also to be understood that while the system has been described with respect to a submersible pump, a pump mounted externally of holding chamber 50 could be employed, the externally mounted pump being connected to suitable tubing that extended down into holding chamber 50. Lastly, it is to be understood that while some form of forced pumping of the liquid in holding chamber 50 is preferred, it is possible that the liquid in holding chamber 50 could be discharged through a drain field simply by gravity flow.

In the preferred embodiment of the wastewater treatment plant of the present invention, containment vessels 18 and 20 are generally cylindrical and, as will be described more fully hereinafter, are rigidly interconnected so as to provide a single unit that is compact, requires one excavation at a single level or elevation, and can be easily transported and handled during the installation procedure. In the preferred embodiment—i.e., when first and second containment vessels are cylindrical—the vessels can be secured to one another by any technique that substantially prevents one of the containment vessels from moving relative to the other containment vessel during handling, transportation, or installation. Accordingly, without limiting the techniques of rigidly connecting the first and second containment vessels, several preferred methods are shown in FIGS. 3 and 5–7.

One system for interconnecting containment vessels 18 and 20 is shown in FIGS. 1–3 and 5 and 6. With reference first to FIGS. 5 and 6, it can be seen that vessels 18 and 20 are generally disposed adjacent one another. The term "adjacent" as used herein encompasses the vessels actually in contact with one another, as well as being slightly spaced, as shown, for examples, in FIGS. 2, 5, and 6. The cylindrical wall 22 of first containment vessel 18 has an outer wall surface 130, while the cylindrical wall 24 of second containment vessel 20 has an outer wall surface 132, wall surfaces 130 and 132 being cylindrical. As seen in FIG. 6, the converging cylindrical walls 22 and 24 form a first, generally V-shaped space 134 and a second, generally V-shaped space 136, V-shaped spaces 134 and 136 running generally longitudinally of cylindrical walls 22 and 24. A first plate 138 at least partially spans a portion of the first V-shaped space 134; i.e., although it could, it does not extend for the full longitudinal extent of V-shaped space 134. First plate 138 has a first side edge 140 and a second side edge 142. Side edge 140 is secured to the outer wall surface 130 of cylindrical side wall 122, and second side edge 142 is secured to the outer wall surface 132 of side wall 24. In the embodiment shown, vessels 18 and 20 are of fiberglass construction, as is first plate 138. Accordingly, plate 138 is readily secured to surfaces 130 and 132 by means of flexible fiberglass mats 144 and 146, respectively, which are commonly used in fiberglass fabrication techniques. Essentially, first plate 138 is bonded to vessels 18 and 20. In a similar fashion, a second plate 138a having side edges 140a and 142a is bonded to vessels 18 and 20 using fiberglass mats 144a and 146a, respectively.

With reference now to FIGS. 7 and 8, there is shown another technique for forming containment vessels 18 and 20 into a single, generally rigid unit. Instead of plates 138 and 138a, as shown in FIGS. 5 and 6, containment vessels 18 and 20 are interconnected by means of generally V-shaped gussets 150 received in first, generally V-shaped space 134 and gussets 150a received in second, generally V-shaped space 136. Once again, with containment vessels 18 and 20 being of fiberglass construction and gussets 150 and 150a being of fiberglass construction, the gussets can be easily bonded to the walls of the containment vessels, thereby forming a single, rigid unit of the two vessels. It will also be appreciated that a single housing, of fiberglass or similar construction, could be formed, the housing having a partition that would effectively divide the housing into a first containment vessel and a second containment vessel, the first containment vessel again containing a suitable partition to form a compartment such that the first containment vessel in the unitary housing contains both a pretreatment chamber and a holding or pump chamber. Thus, a rectangular boxlike structure could be employed to form the two containment vessels.

Figure 4:
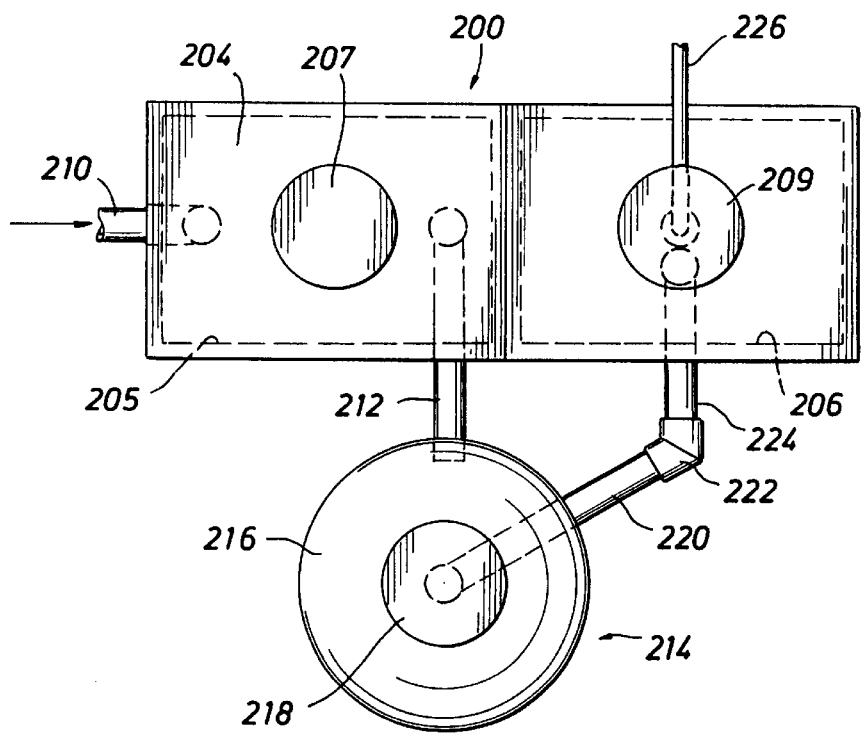
FIG. 4 is a top plan view of another embodiment of the wastewater treatment plant of the present invention.

With reference now to FIG. 4, there is shown another embodiment of the present invention wherein the first containment vessel, shown generally as 200, is comprised of a generally rectangular tank, preferably made of concrete and having a perimeter wall. It will be understood that the perimeter wall, together with top wall 204 and a bottom wall not shown, form a generally rectangular, first containment vessel. A partition shown in phantom divides first containment vessel 200 into a compartment defining a pretreatment chamber 205 into which wastewater effluent flows via an inlet 210 and a holding chamber 206 separated from pretreatment chamber 205 by the partition. Top wall 204 has removable access hatches 207 and 209, providing access to chambers 205 and 206, respectively.

Effluent from chamber 205 passes via conduit 212 into a second containment vessel, shown generally as 214, containment vessel 214 forming an aeration chamber and a clarifier chamber, as described above with respect to containment vessel 20. Containment vessel 214 also has a top wall 216 with a removable access hatch 218. Clarified effluent from containment vessel 214 flows from containment vessel 214 via conduit 220, elbow 222, and conduit 224 into holding chamber 206. As in the case of the system described above with respect to containment vessels 18 and 20, holding chamber 206 is provided with a suitable pump (not shown) from which treated and clarified effluent can be discharged via line 226 for the watering of lawns, irrigation, or other such uses.

While vessels 18 and 20 are shown as being cylindrical, it will be apparent that they could be of any shape—i.e., rectangular, hexagonal, etc. Likewise, while third containment vessel 46 is also shown as being cylindrical, it could also be of any configuration. Containment vessel 46 is generally formed of a separate vessel and then positioned and rigidly held inside of containment vessel 18. However, it will be recognized that, particularly in the case of fiberglass construction, suitable walls could be formed inside of vessel 18 to form pretreatment chamber 48.

The wastewater treatment plant of the present invention can be constructed from various materials, such as fiberglass, suitable rigid plastics, steel, or composites, e.g., concrete composites, concrete, etc. Preferably, and particularly with respect to the embodiment of the present invention shown in FIGS. 1–3 and 5–8, the wastewater treatment plant is constructed primarily of fiberglass, save for plumbing connections, electrical connections, etc.

The term "compartment" as used herein refers to any partition, wall, or vessel that, in conjunction with the first containment vessel in which the compartment is formed, can provide both a pretreatment chamber and a holding or tank chamber in the first containment vessel. Obviously, the compartment must be constructed such that the pretreatment chamber and the holding chamber remain isolated from one another so as to prevent contamination of the treated clarified water in the holding chamber with raw waste from the pretreatment chamber.

The wastewater treatment plant of the present invention provides many advantages. For one, and as noted above, only one earth excavation need be made for the preferred embodiment of the present invention shown in FIGS. 1 and 2, and the excavation need only have one bottom elevation. Since the preferred embodiment of the wastewater treatment plant of the present invention is basically a single, rigid unit, there is no need for any significant plumbing to be done at the installation site; rather, all piping, save for the inlet to the first containment vessel, can be done in the factory. Additionally, the preferred embodiment of the present invention has only two risers or manholes and thus is more aesthetically desirable than are systems having three visible risers or manholes.

Another advantage of the preferred embodiment of the present invention is that access to the pretreatment chamber and to the chlorinator is achieved simply by removing the hatch over the opening to the first containment vessel. As previously noted, the top opening into the pretreatment chamber is generally in register with the opening through the top of the first containment vessel, which means that by removing the hatches from the respective openings, the pretreatment chamber can easily be pumped out when necessary.

The unique positioning of the pretreatment chamber in the first containment vessel serves to weight balance the unit, even when the liquid level in the holding or pump chamber is at a low level. In effect, the third containment vessel forming the pretreatment chamber serves as ballast to maintain the entire unit stable in areas where there is a high water table and there would be a tendency for the first containment vessel to float if the water in the pump or holding chamber were depleted. By effectively keeping the pretreatment chamber in the holding or pump chamber at one end of the unit—i.e., in the first containment vessel—and the aerobic treatment and clarifier chambers at the other end of the unit—i.e., in the second containment vessel—the system remains substantially in weight distribution balance in the sense that there is always sufficient weight at both ends of the unit to prevent any excessive stresses on the structural members used to secure the first and second containment vessels together; i.e., there is no tendency for one end of the unified structure to become buoyant due to high water table levels and thereby exert a bending movement that would act on the members—i.e., the plates 138, 138*a* or the gussets 150, 150*a*—securing the first and second containment vessels together. Indeed, in other one-piece units, the pretreatment chamber, the aerobic treatment chamber, and the holding chamber are in series, with the result that if the contents of the holding chamber are pumped to a low level, the unit becomes unbalanced since there is a greater downward force acting on the end of the unit containing the pretreatment vessel; i.e., the end of the unit containing the holding chamber becomes more buoyant.

As noted above, in the preferred embodiment of the present invention, the wastewater treatment plant of the present invention is comprised of first and second containment vessels that are rigidly secured to one another to basically form a unitary structure. It is to be understood, however, that the invention is not limited to rigid interconnection of the first and second containment vessels. If desired, the first and second containment vessels, e.g., vessels 18 and 20, could be plumbed and installed individually at the excavation site. It will be recognized that even in the case where the first and second containment vessels are not rigidly interconnected, the unique configuration of the first containment vessel that houses both the pretreatment chamber and the holding or pump chamber ensures that the first containment vessel will not have a tendency to float in high water tables—i.e., there will always be sufficient weight in the first containment vessel to keep it from becoming buoyant. Obviously, however, and as pointed out above, rigidly interconnecting the two vessels has numerous advantages. It is also to be understood that the term "rigid" with respect to describing the interconnection of the first and second containment vessels is not limited to a structure wherein some member(s), e.g., plates 138, 138*a,* are bonded to each of the containment vessels, the vessels bonded to each other, etc. In other words, the rigid interconnection between the first and second containment vessels could be accomplished by a mechanical system that holds the first and second containment vessels together such that they could be effectively handled, transported, and installed as a single unit. Indeed, in certain cases, a releasable mechanical connection between the first and second containment vessels might be desired in the unlikely event that one of the vessels developed leakage or other loss of structural integrity. In such a case, the mechanical system used to connect the first and second vessels could be released, the damaged containment vessel replaced, and the system put back into operation.

While the invention has been described above with respect to disinfecting the water in the holding chamber by means of chlorine tablets, it is to be understood that other methods of disinfecting the water can be employed. For example, the water in holding chamber 50 could be ozonized using a suitable ozonizer. Additionally, UV radiation could be used to disinfect the water in holding chamber 50. Lastly, it is to be understood that the term "chlorine tablets" includes any form of chemical disinfecting agent that is commonly used to treat water and reduce or eliminate its bacteria content. Thus, any of the common chemicals used in swimming pools, spas, or the like can be employed and are included within the scope of the term "chlorine tablets."

While not shown, it will be appreciated that a high water level float could be disposed in clarifier chamber 90, the high water level float being suitably connected to an alarm system.

The foregoing description and examples illustrate selected embodiments of the present invention. In light thereof, variations and modifications will be suggested to one skilled in the art, all of which are in the spirit and purview of this invention.

What is claimed is:

1. A wastewater treatment plant, comprising:
   a first containment vessel;
   a second containment vessel forming an aerobic treatment chamber, said second containment vessel having an inlet and an outlet;
   a compartment formed in said first containment vessel, said compartment and said first containment vessel cooperating to form a pretreatment chamber inside said compartment and a holding chamber formed by said compartment and said first containment vessel, said pretreatment chamber having an inlet and an outlet and said holding chamber having an inlet and an outlet;

said outlet from said pretreatment chamber being in open communication with said inlet to said second containment vessel; and said outlet from said aerobic treatment chamber being in open communication with said inlet to said holding chamber.

2. The wastewater treatment plant of claim 1 wherein said compartment comprises a third containment vessel.

3. The wastewater treatment plant of claim 2 wherein said first and third containment vessels are generally cylindrical.

4. The wastewater treatment plant of claim 3 wherein said second containment vessel is generally cylindrical.

5. The wastewater treatment plant of claim 4 wherein said first containment vessel has a top wall forming a first access opening and said third containment vessel has a top wall forming a second access opening, said second access opening being generally in register with said first access opening.

6. The wastewater treatment plant of claim 1 wherein said outlet from said holding chamber is operatively connected to a pump for pumping water from said holding chamber.

7. The wastewater treatment plant of claim 1 wherein said second containment vessel includes a clarifier chamber in open communication with said aerobic treatment chamber, said outlet from said second containment vessel being in open communication with said clarifier chamber.

8. The wastewater treatment plant of claim 1 wherein there is an aeration source disposed in said aerobic treatment chamber.

9. The wastewater treatment plant of claim 8 wherein said second containment vessel comprises a generally cylindrical sidewall and a substantially planar bottom wall and said aeration source provides a single aeration locus adjacent an intersection of said side wall and said bottom wall.

10. The wastewater treatment plant of claim 9 wherein said aeration source includes a single diffuser adjacent said intersection.

11. The wastewater treatment plant of claim 9 wherein said aeration source includes multiple diffusers adjacent said intersection.

12. The wastewater treatment plant of claim 1 wherein said first containment vessel has a generally cylindrical side wall, said second containment vessel has a generally cylindrical side wall, and said first and second containment vessels are rigidly secured to one another.

13. The wastewater treatment plant of claim 12 wherein each of said first and second containment vessels has a substantially planar bottom wall secured to respective ones of said cylindrical side walls, said planar bottom walls of said first and second containment vessels being generally coplanar.

14. The wastewater treatment plant of claim 12 wherein said first and second containment vessels are closely adjacent one another.

15. The wastewater treatment plant of claim 14 wherein each of said cylindrical side walls has an outer wall surface, converging portions of said cylindrical side walls of said first and second containment vessels forming a first, generally V-shaped space and a second, opposed, generally V-shaped space.

16. The wastewater treatment plant of claim 15 wherein there is at least one first gusset disposed in said first V-shaped space and rigidly secured to said outer wall surfaces of said cylindrical side walls of said first and second containment vessels and at least one second gusset disposed in said-second V-shaped space and secured to said outer wall surfaces of said cylindrical walls of said first and second containment vessels.

17. The wastewater treatment plant of claim 16 wherein there are a plurality of said first and second gussets.

18. The wastewater treatment plant of claim 15 wherein there is a first plate at least partially spanning a portion of said first V-shaped space, said first plate having a first side edge secured to said outer wall surface of said first containment vessel and a second side edge rigidly secured to said outer wall surface of said second containment vessel and a second plate at least partially spanning said second V-shaped space, said second plate having a first side edge secured to said outer wall surface of said first containment vessel and a second side edge secured to said outer wall surface of said second containment vessel.

19. The wastewater treatment plant of claim 1 wherein said first containment vessel comprises a generally rectangular housing and said compartment is formed by a partition dividing said housing into said pretreatment chamber and said holding chamber.

20. The wastewater treatment plant of claim 4 wherein said rectangular housing is formed of concrete.

* * * * *

UNITED STATES PATENT AND TRADEMARK OFFICE
CERTIFICATE OF CORRECTION

PATENT NO.    : 6,358,411 B1
DATED         : March 19, 2002
INVENTOR(S)   : Jerry L. McKinney It is certified that error appears in the above-identified patent and that said Letters Patent is hereby corrected as shown below:

<u>Column 10,</u>
Line 41, delete "4" and insert therefor -- 19 --

Signed and Sealed this

Twenty-second Day of October, 2002

Attest:

Attesting Officer

JAMES E. ROGAN
*Director of the United States Patent and Trademark Office*